Feb. 20, 1962  J. ROWITZ  3,021,580
SLACK TAKE-UP DEVICE
Filed March 28, 1960
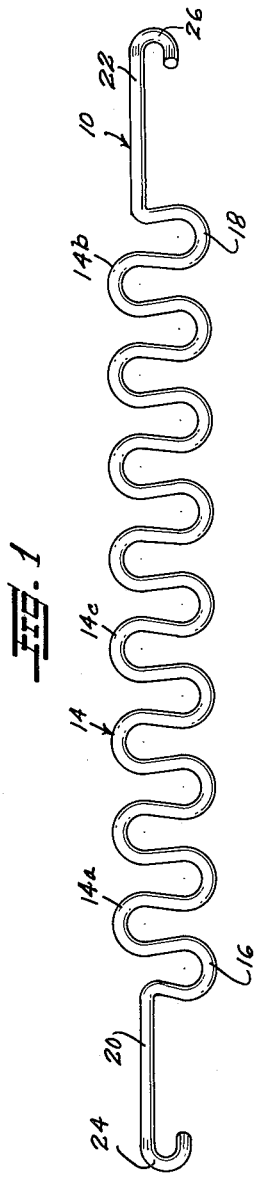
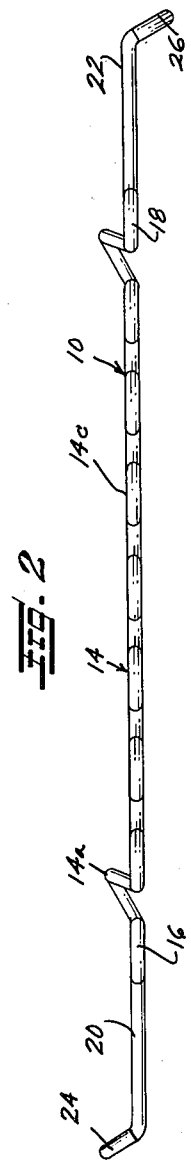
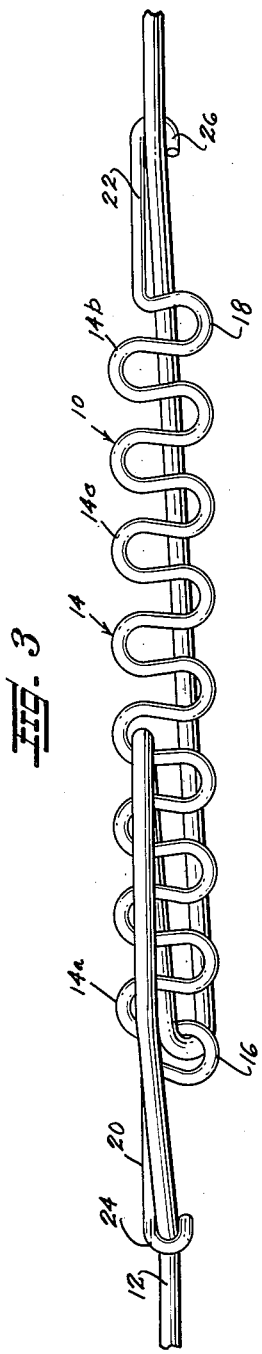
Inventor
Joseph Rowitz
By Hill, Sherman, Meroni, Gross & Simpson Attys

United States Patent Office 3,021,580
Patented Feb. 20, 1962

3,021,580
SLACK TAKE-UP DEVICE
Joseph Rowitz, Chicago, Ill.
Filed Mar. 28, 1960, Ser. No. 18,015
1 Claim. (Cl. 24—71.3)

This invention relates to a slack take-up device and more particularly to a device for selective tensioning of a line such as a clothes line, guy wire, electric cable or the like which is both simple and highly effective in use.

Heretofore, a variety of slack take-up devices have been available, but these have generally involved winding the line to be tensioned around a protuberant element of a crank structure. This expedient has had the disadvantage that a number of turns have been required for the usual tightening operation, and the line which is thus wound has not been as firmly positioned on the take-up device as is desirable. Furthermore, difficulties have been encountered in estimating the extent of windings required, and in some instances in holding the device in slack take-up position once winding has been accomplished.

The present invention resolves these difficulties by means of an exceptionally simple construction wherein a plurality of sinuous loops are formed axially along a wire-like structure which may be formed of resilient metal or the like. The endmost loops are preferably offset slightly from the axis of the device to prevent biting in and abrasion of a line to be tensioned, and the intermediate loops may be in coplanar axial relationship, or offset, as desired. Adjacent the said endmost loops a half loop formation is preferably provided with the wire or rod structure extending axially therefrom for a slight predetermined distance and having hook-like members at the ends thereof for engaging the line to be tensioned. Thus, in taking up the slack in a clothes line, or other such line, the line is slipped into one of the endmost loops and threaded through the adjacent half loop and an intermediate loop. Thereupon the device is rotated 180° and the hooks connected to the line so that slack is taken up to substantially twice the distance between the intermediate loop and the endmost loop, with the hooks maintaining the device securely in position. In fact, the hook adjacent the endmost loop may be used individually for this purpose without the need for engaging the other of the hooks and it is thus apparent that the engagement of the slack take-up device with the line is exceptionally secure.

Accordingly, it is an object of the present invention to provide a slack take-up device which requires no winding or other extensive manipulation, and which may be used to adjustably remove the slack in accordance with the selection of one of a series of axially aligned loops for engaging the line.

Another object of the invention is to provide a device as described which is unusually simple in construction and may be formed by well known techniques, so that only one length of wire or rod is required and only one part is needed.

Another object of the invention is to provide a device as described which is exceptionally secure once it has been engaged in tensioning position on a line.

Yet another object of the invention is to provide a device as described which is not subject to "jumping" or disengagement during its positioning on the line.

Other objects and advantages of the invention will become apparent as the description proceeds in accordance with the drawings in which:

On the drawings:

FIGURE 1 is a side elevational view of a slack take-up device according to the present invention;

FIGURE 2 is a top plan view of the structure shown in FIGURE 1; and

FIGURE 3 is a view corresponding to the view of FIGURE 1 showing the device in slack take-up position.

As shown on the drawings:

Referring now to the drawings, the slack take-up device 10 of the invention is desirably formed from a single length of wire or other suitable material, which may be spring steel, for example. The dimensions and thickness of the wire may be varied depending upon the particular application desired, and for example, may be approximately 9 inches long where it is to be used for tensioning clothes lines or the like. A wire which is 3/8 inch thick has been found suitable for such applications, although, as stated, other dimensions are also encompassed within the scope of the invention. The device 10 is shown in FIGURE 3 as used for tensioning a flexible line 12 such as a clothes line, this line being illustrated as having a thickness somewhat less than would occur in practice with respect to the particular device shown, for purposes of clarity.

In accordance with the invention, a plurality of sinuous loops 14 of preferably equal size are formed along the device 10, eight such loops being shown opening toward the right in the embodiment illustrated, although here again, variation in the specific number of such loops is encompassed within the invention. The loops are smaller at their open ends than at their inner ends whereby to mechanically restrain a line introduced thereinto as hereinafter described, so that, with respect to the line 12, the open or outer end of a loop would tend to engage the said line and hold it against inadvertent removal. The loops 14 define opposite or leftwardly facing loops therebetween, although these loops are preferably not utilized in the slack take-up operation hereinafter described. Thus the loops 14 provide a set of recesses facing in the same direction for receiving a line, also as hereinafter described these recesses being axially spaced by oppositely facing recesses. End loops or recesses of the loops 14 are indicated by reference numerals 14a and 14b respectively, which are offset angularly from the axis of the device 10, preferably by an angle of approximately 30° so as to prevent the device from cutting into the line. As seen in FIGURE 2, the intermediate loops or recesses 14c of the set of loops of recesses 14 desirably are coplanar and axially aligned with the device, although they also may be offset if desired. Immediately adjacent and continuous with the end loops 14a and 14b of the set of loops 14 are half loops 16 and 18 which open in a direction opposite to the direction of the said adjacent end loops 14a and 14b and cooperate with the end loops 14a and 14b to define pairs of oppositely directed recesses at each end of the device 10. End extensions 20 and 22 are formed continuously and axially from the half loops 16 and 18, and in order to secure the device in engaged position after slack take-up has been accomplished, hooks 24 and 26 are formed integrally on the extensions 20 and 22, the said hooks being offset angularly in opposite directions, as for example by 45°, as shown more particularly in FIGURE 2.

In connecting the device 10 to a line such as the line 12, one or the other of the end loops 14a and 14b is hooked onto the line, it being noted that these loops open in the same direction as a result of the even number of loops provided in the device. Thereupon the rope is wound into an adjacent half loop, such as the half loop 16 in the example chosen. It will be understood that these half loops may be given a length corresponding to the loops 14c if desired within the scope of the invention. However, the axial alignment of the device is effected more efficiently where a half loop terminal structure is used. Thereafter the line is slipped into one of the middle loops 14c, and is preferably turned 90° about the axis of the device to prevent the device from twisting out of the operator's hands in completing the tensioning. The entire structure is then rotated 180° around an axis perpendicular to the axis of the line 12 and the end opposite the end loop first selected (14a in the example shown) is engaged to the line by hooking the hook member thereof (e.g. hook member 26) onto the line. The other hook, i.e. the hook 24, is then hooked onto the line so that the device is held against any possibility of inadvertent disengagement. However, the device 10 will be entirely stable even if the hook 26 is not engaged on the line.

Accordingly, there has been provided a slack take-up device which is of a one-piece, unusually simple construction, and may be readily manufactured by simple bending operations. No special skills or techniques are required in installing the device on a line, and as a result, the device has application in a wide variety of situations in addition to its use as a clothes line tensioning means.

Although I have herein set forth and described my invention with respect to certain specific principles and details thereof, it will be understood by those skilled in the art that these may be varied without departing from the spirit and scope of the invention as set forth in the hereunto appended claim.

I claim as my invention:

A slack take-up device for selective tensioning of lines, cables and the like comprising an elongate member forming a plurality of axially spaced recesses configured to receive and engage a line therein, including a pair of adjoining recesses at one end of the member opening in substantially opposite directions from one another and a plurality of recesses intermediate the ends of the member, said recesses intermediate the ends of the member being of an even number and opening in substantially the same direction as the inner recess of said pair of adjoining recesses, a hook on the extremity of said one end of said member and adjacent said pair of adjoining recesses and a hook on the other end of said member, said hook on the other end of said member opening in a direction away from the direction of the hook adjacent said pair of adjoining recesses whereby the line may be threaded through said pair of adjoining recesses and through one of said recesses intermediate the ends of said member and may be engaged in said hooks when the member is turned about an axis substantially perpendicular to its longitudinal axis.

References Cited in the file of this patent

UNITED STATES PATENTS

| | | |
|---|---|---|
| D. 34,630 | Elder | June 4, 1901 |
| 164,910 | Duffy | June 29, 1875 |
| 2,597,210 | Walters | May 20, 1952 |